(12) United States Patent
Sahasranamam et al.

(10) Patent No.: US 12,124,884 B2
(45) Date of Patent: Oct. 22, 2024

(54) MANAGING DEPLOYMENT OF WORKLOADS

(71) Applicant: Hewlett Packard Enterprise Development LP, Houston, TX (US)

(72) Inventors: Srinivasan Varadarajan Sahasranamam, Bangalore Karnataka (IN); Mohan Parthasarathy, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 631 days.

(21) Appl. No.: 17/302,012

(22) Filed: Apr. 21, 2021

(65) Prior Publication Data

US 2022/0164229 A1 May 26, 2022

(30) Foreign Application Priority Data

Nov. 23, 2020 (IN) .............................. 202041050986

(51) Int. Cl.
*G06F 9/50* (2006.01)
(52) U.S. Cl.
CPC ............ *G06F 9/505* (2013.01); *G06F 9/5094* (2013.01)
(58) Field of Classification Search
None
See application file for complete search history.

(56) References Cited

U.S. PATENT DOCUMENTS

| 9,256,467 | B1 | 2/2016 | Singh et al. | |
| 2012/0198073 | A1* | 8/2012 | Srikanth | H04L 67/10 709/226 |
| 2017/0023560 | A1 | 8/2017 | Gupta et al. | |
| 2018/0260566 | A1* | 9/2018 | Chaganti | G06F 9/5077 |
| 2019/0384367 | A1* | 12/2019 | Jain | G06F 1/3296 |
| 2022/0114026 | A1* | 4/2022 | Cropper | G06F 9/5027 |
| 2022/0156362 | A1* | 5/2022 | Takahashi | G06F 8/61 |

OTHER PUBLICATIONS

Arnold et al., "Workload Orchestration and Optimization for Software Defined Environments", IBM, vol. 58, No. 2/3, 2014, 12 pages.

(Continued)

*Primary Examiner* — Eric C Wai
(74) *Attorney, Agent, or Firm* — Slater Matsil, LLP (57) ABSTRACT

Examples described herein relate to a management node and a method for managing deployment of a workload. The management node may obtain values of resource labels related to platform characteristics of a plurality of worker nodes. Further, the management node may determine values of one or more custom resource labels for each of the plurality of worker nodes, wherein a value of each custom resource label of the one or more custom resource labels is determined based on values of a respective set of resource labels of the resource labels. Furthermore, the management node may receive a workload deployment request including a workload description of a workload. Moreover, the management node may deploy the workload on a worker node of the plurality of worker nodes based on the workload description and the values of the one or more custom resource labels.

20 Claims, 5 Drawing Sheets

(56) References Cited

OTHER PUBLICATIONS

Cisco, "Cisco Secure Workload Platform", Data sheet, Mar. 2021, pp. 1-16.
Flexera, "RightScale 2019 State of the Cloud Report from Flexera", 2019, 50 pages.
Hewlett Packard Enterprise, "HPE Insight Cluster Management Utility v8.2 User Guide", Jun. 2017, 277 pages.
Hewlett Packard Enterprise, "OneView—QuickSpecs", Nov. 2020, 21 pages.
IDC, "Spending on Public Cloud IT Infrastructure Surpasses Spending on Traditional IT Infrastructure for the First Time in the Second Quarter of 2020, According to IDC", available online at www.idc.com/getdoc.jsp?containerId=prUS46895020., Sep. 29, 2020, 7 pages.
M. Essery, "Enterprise IT executives expect 60% of workloads will run in the cloud by 2018", available online at 451research.com/blog/764-enterprise-it-executives-expect-60-of-workloads-will-run-in-the-cloud-by-2018>, Sep. 1, 2016, 3 pages.
Microsoft, "FailoverClusters", available online at web.archive.org/web/20190609112127/https://docs.microsoft.com/en-us/powershell/module/failoverclusters/?view=win10-ps>, Jun. 9, 2019, 8 pages.
Rutten, Peter, "HPE's Superdome X: The Mission-Critical Scale-Up x86 Platform for SAP, Oracle, and SQL Server", IDC, White Paper, Jun. 2016, 15 pages.
Schedmd, "Slurm Workload Manager—Overview", available online at web.archive.org/web/20201111211311/https://slurm.schedmd.com/overview.html>, Nov. 11, 2020, 6 pages.
Schedmd, "Slurm Workload Manager—slurm.conf", available online at web.archive.org/web/20201025083615/https://slurm.schedmd.com/slurm.conf.html>, Oct. 25, 2020, 119 pages.
Sliwko et al., "Workload Schedulers—Genesis, Algorithms and Comparisons", International Journal of Computer Science and Software Engineering (IJCSSE), vol. 4, Issue 6, Jun. 2015, pp. 141-155.
Venture Outsource, "ODM Quanta focus on white boxes bypasses Dell, HP, Cisco traditional model for OEMs", available online at web.archive.org/web/20200815211053/https://www.ventureoutsource.com/contract-manufacturing/focus-odm-quanta-it-shift-cloud-infrastructure-leaving-dell-hp-traditional>, Aug. 15, 2020, 2 pages.
Venture Outsource, "OEM cost reductions in vertically integrated electronics services providers", available online at web.archive.org/web/20200807020318/https://www.ventureoutsource.com/contract-manufacturing/benchmarks-best-practices/electronics-assembly/outsourcing-cost-reductions-and-benefits>, Aug. 7, 2020, 3 pages.
Cremins, D., et al.; "Telemetry Aware Scheduling (TAS)—Automated Workload Optimization with Kubernetes (K8s*) Technology Guide"; Apr. 24, 2020; 11 pages.
Huang, W. et al.; "Telemetry Aware Scheduling—Automated Workload Optimization with Kubernetes* (K8s*) Technology Guide"; Apr. 24, 2019; 9 pages.
Santos, J. et al.; "Towards Network-Aware Resource Provisioning in Kubernetes for Fog Computing Applications"; Jul. 2019; 9 pages.

* cited by examiner

MANAGING DEPLOYMENT OF WORKLOADS

BACKGROUND

Data may be stored on computing nodes, such as a server, a storage array, a cluster of servers, a computer appliance, a workstation, a storage system, a converged system, a hyper-converged system, or the like. The computing nodes may host workloads that may generate or consume the data during their respective operations.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored and/or processed in computing nodes, such as a server, a storage array, a cluster of servers, a computer appliance, a workstation, a storage system, a converged system, a hyperconverged system, or the like. The computing nodes may host and execute workloads that may generate and/or consume the data during their respective operations. Examples of such workloads may include, but are not limited to, a virtual machine, a container, a pod, a database, a data store, a logical disk, or a containerized application.

In some examples, workloads may be managed via a workload-orchestration system. For example, workloads such as pods may be managed via container orchestration system such as Kubernetes. The workload-orchestration system may be operational on a computing node, hereinafter referred to as a management node. The management node may receive a workload deployment request to deploy a workload and schedule deployment of the workload on one or more of other computing nodes, hereinafter referred to as, worker nodes. In some instances, the management node may deploy one or more replicas of the workloads on several worker nodes to enable high availability of the workloads. The worker nodes may facilitate resources, for example, compute, storage, and/or networking capability, for the workloads to execute.

Scheduling of the workloads may be managed to address the need for rapid deployment of services, at cloud scale, keeping in mind factors like agility, ease of application upgrades or rollbacks and cloud-native workloads. Such scheduling of the workloads often works well in networked systems (e.g., Kubernetes clusters) including worker nodes having commodity hardware (e.g., standard x86 processing resources). In certain implementations, the worker nodes in the networked systems may include premium hardware. For example, due to wider adoption of containers in several enterprises, worker nodes in state of the art Kubernetes clusters include premium hardware to run business critical workloads. In order to achieve maximum return on investment (ROI) and reduced or lowest total cost of ownership (TCO), execution of the workloads on right kind of hardware is desirable. This is possible when workload placement is optimal, i.e., workloads are deployed on the worker nodes having the right kind of hardware. Workload-orchestration system such as Kubernetes supports manual labeling of worker nodes and scheduling of the workloads based on such manually defined resource labels. Such manual process of labeling the worker nodes requires administrative intervention and is labor intensive.

Certain versions of container orchestrators or platforms such as Kubernetes may support a node feature discovery capability (which may be implemented as an add-in) that enables the worker nodes to detect and advertise/publish hardware and software capabilities of the worker node. The published hardware and software capabilities of the worker nodes can in turn be used by a scheduler running on the management node (alternatively referred to as a master node) to facilitate intelligent scheduling of workloads. The Node feature discovery add-in on a given worker node allows the given worker node to publish its hardware and software capabilities in the form of resource labels. Traditionally, the resource labels published by the worker nodes are too granular and provide excessive information that may be difficult to analyze and arrive at scheduling decisions. Use of each of the resource labels or even selection of right kind of resource labels for taking scheduling decision has been a challenging task.

To that end, in accordance with aspects of the present disclosure, a management node is presented that facilitates enhanced scheduling of workloads taking into consideration self describing workloads and certain custom resource labels that are automatically determined based on the resource labels associated with the worker nodes. In some examples, the management node may obtain values of resource labels related to platform characteristics of a plurality of worker nodes. The platform characteristics may include one or more of thermal stability, memory and bandwidth, compute performance, or security. Further, the management node may determine values of one or more custom resource labels for each of the plurality of worker nodes, wherein a value of each custom resource label of the one or more custom resource labels is determined based on values of a respective set of resource labels of the resource labels. Furthermore, the management node may receive a deployment request to deploy a workload (hereinafter referred as a workload deployment request). The workload deployment request may include a workload description that defines the workload. Moreover, the management node may deploy the workload on a worker node of the plurality of worker nodes based on the workload description and the values of the one or more custom resource labels.

As will be appreciated, the management node and the methods presented herein facilitates enhanced scheduling/deployment of workloads via use of meaningfully generated custom resource labels—values of which may be automatically calculated and/or updated based on several fine grained resource labels that are published by the worker nodes. By building scheduling or deployment capabilities on workload-orchestration systems (e.g., Kubernetes) based on published performance and security capabilities, or performance and security limitations, user can run workloads such as business applications with awareness of worker nodes' hardware and software capabilities and/or vulnerabilities. In particular, enhanced deployment of the workloads as effected by various example aspects presented herein ensures that the workloads are executed on a well-equipped worker node having sufficient resources to fulfill requirements of the workloads. Deployment of the workloads based on the values of the custom resource labels and the workload descriptions may enable enhanced performance and security for the workloads on networked systems (e.g., Kubernetes clusters) either in a customer's on-premise private cloud datacenter owned or leased by the customer or consumed as a vendor's as-a-service offering (e.g., through a pay-per-use or consumption-based financial model). Moreover, as the values of the custom resources and the workload descriptions are determined automatically and dynamically during the operation, manual intervention may be reduced or eliminated.

Figure 1:
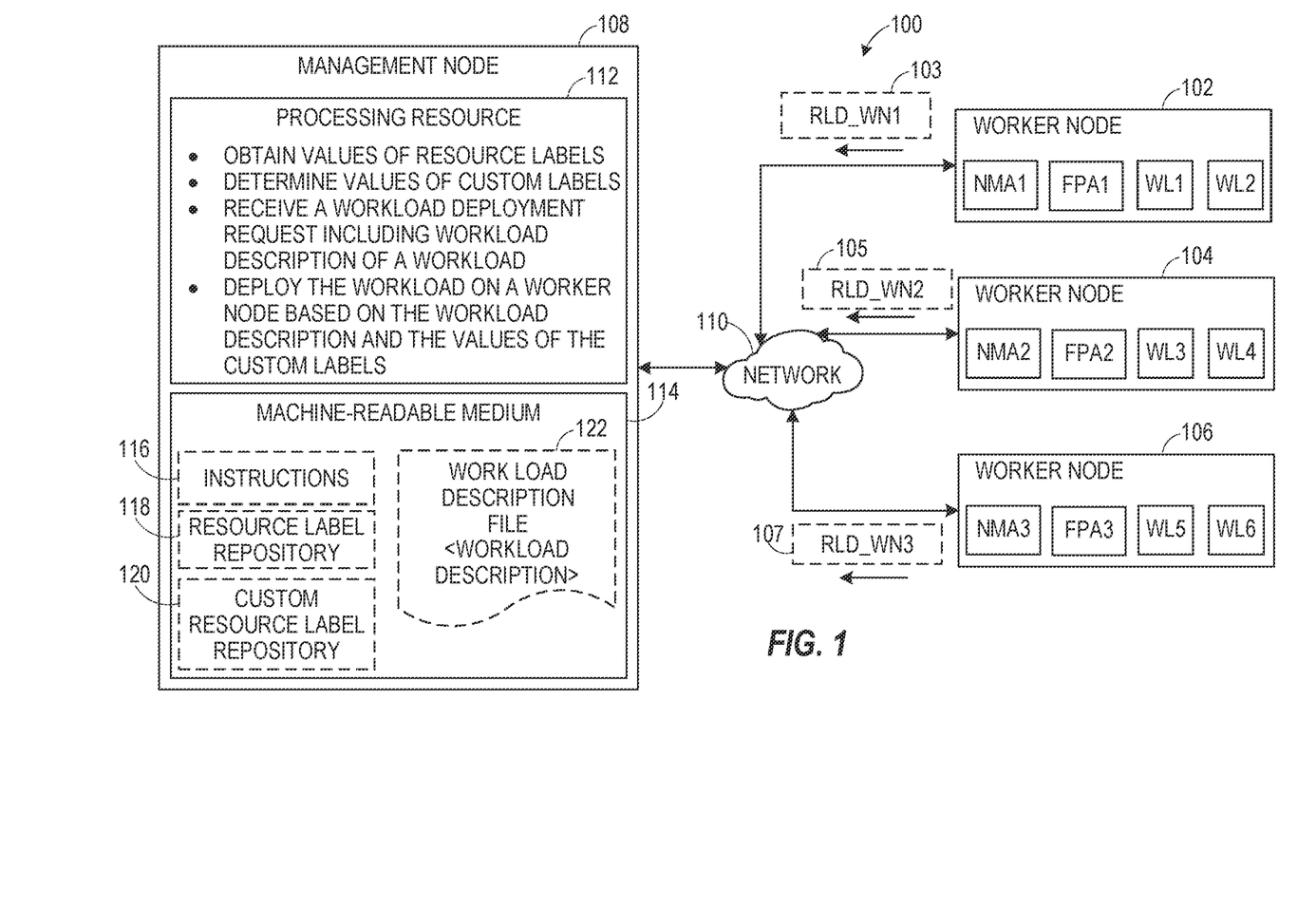
FIG. 1 depicts a networked system including a plurality of worker nodes and a management node for managing deployment of a workload on the worker nodes, in accordance with an example.

Referring now to the drawings, in FIG. 1, a networked system 100 is depicted, in accordance with an example. The networked system 100 may include a plurality of worker nodes 102, 104, and 106, hereinafter, collectively referred to as worker nodes 102-106. Further, the networked system 100 may also include a management node 108 coupled to the worker nodes 102-106 via a network 110. In some examples, the networked system 100 may be a distributed system where one or more of the worker nodes 102-106 and the management node 108 are located at physically different locations (e.g., on different racks, on different enclosures, in different buildings, in different cities, in different countries, and the like) while being connected via the network 110. In certain other examples, the networked system 100 may be a turnkey solution or an integrated product. In some examples, the terms "turnkey solution" or "integrated product" may refer to a ready for use packaged solution or product where the worker nodes 102-106, the management node 108, and the network 110 are all disposed within a common enclosure or a common rack. Moreover, in some examples, the networked system 100 in any form, be it a distributed system, a turnkey solution, or an integrated product may be capable of being reconfigured by adding or removing worker nodes and/or by adding or removing internal resources (e.g., compute, storage, network cards, etc.) to and from the worker nodes 102-106 and the management node 108.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via a wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the management node 108 and the worker nodes 102-106.

Each of the worker nodes 102-106 may be a device including a processor or microcontroller and/or any other electronic component, or a device or system that may facilitate various compute and/or data storage services. Examples of the worker nodes 102-106 may include, but are not limited to, a desktop computer, a laptop, a smartphone, a server, a computer appliance, a workstation, a storage system, or a converged or hyperconverged system, and the like. In FIG. 1, although the networked system 100 is shown to include three worker nodes 102-106, the networked system 100 may include any number of worker nodes, without limiting the scope of the present disclosure. The worker nodes 102-106 may have similar or varying hardware and/or software configurations in a given implementation of the networked system 100. By way of example, while some worker nodes may have high-end compute capabilities, some worker nodes may facilitate strong data security, and certain worker nodes may have enhanced thermal capabilities.

The worker nodes 102-106 may facilitate resources, for example, compute, storage, and/or networking capabilities, for one or more workloads to execute thereon. The term workload may refer to a computing resource including, but are not limited to, an application (e.g., software program), a virtual machine (VM), a container, a pod, a database, a data store, a logical disk, or a containerized application. As will be understood, a workload such as a VM may be an instance of an operating system hosted on a given worker node via a VM host programs such as a hypervisor. Further, a workload such as a container may be a packaged application with its dependencies (e.g., operating system resources, processing allocations, memory allocations, etc.) hosted on a given worker node via a container host programs such as a container runtime (e.g., Docker Engine), for example. Further, in some examples, one or more containers may be grouped to form a pod. For example, a set of containers that are associated with a common application may be grouped to form a pod.

In the description hereinafter, the workloads are described as being pods for illustration purposes. Pods may be managed via a container-orchestration system such as, for example, Kubernetes. In the example of FIG. 1, the worker node 102 is shown to host workloads WL1 and WL2, the worker node 104 is shown to host workloads WL3 and WL4, and the worker node 106 is shown to host workloads WL5 and WL6. Although certain number of workloads are shown as being hosted by each of the worker nodes 102-106 as depicted in FIG. 1, the worker nodes 102-106 may host any number of workloads depending on respective hardware and/or software configurations.

Moreover, in some examples, one or more of the worker nodes 102-106 may host a node-monitoring agent (NMA) and a feature publisher agent (FPA). In the example of FIG. 1, the worker node 102 is shown to host NMA1 and FPA1, the worker node 104 is shown to host NMA2 and FPA2, and the worker node 106 is shown to host NMA3 and FPA3. The node-monitoring agents NMA1, NMA2, and NMA3 and the feature publisher agents FPA1, FPA2, and FPA3 may represent one type of a workload (e.g., a pod) being executed on the respective worker nodes 102-106. For the sake of brevity, operations of the node-monitoring agent NMA1 and the feature publisher agent FPA1 hosted on the worker node 102 will be described hereinafter. The node-monitoring agents NMA2 and NMA3 may perform similar operations on respective worker nodes 104, 106 as performed by the node-monitoring agent NMA1 on the worker node 102. In addition, the feature publisher agents FPA2 and FPA3 may perform similar operations on respective worker nodes 104, 106 as performed by the feature publisher agents FPA1 on the worker node 102.

During commissioning and/or real-time operation of the worker node 102, the node-monitoring agent NMA1 may monitor the hardware and/or software of the worker node 102 to collect information regarding several platform characteristics of the worker node 102. The platform characteristics that are monitored by the node-monitoring agent NMA1 may include, but are not limited to, one or more of thermal stability, memory and bandwidth, compute performance, or security for the worker node 102. To gather information related to the platform characteristics, the NMA1 may monitor one or more of platform attributes, OS based attributes, attributes related to dynamic system state, or attributes related to security posture.

By way of example, the node-monitoring agent NMA1 may monitor various platform attributes such as, but not limited to, processor registers (e.g., model specific registers on processors), System Management BIOS (SMBIOS) records (e.g., dmidecode output), output of OS commands (e.g., lscpu, turbostat), or vendor specific tools for security vulnerabilities (e.g., tools to identify Spectre or Meltdown vulnerable processors). Further, in some examples, the node-monitoring agent NMA1 may monitor several OS based attributes such as, but not limited to, Non-Uniform Memory Access (NUMA) capability, (e.g., output of numastat), hardware topology (e.g., output of a command—lshw), Network Interface Card (NIC) capability (e.g., output of a command—ethtool), or storage characteristics (e.g., output of a command diskinfo or a command hdinfo). Furthermore, in some examples, the node-monitoring agent NMA1 may monitor several attributes related to dynamic system state such as, but not limited to, CPU and memory utilization (e.g., output of a command top or a command numastat), disk utilization (e.g., output of a command iostat), or network utilization (e.g., output of a command netstat). Moreover, in some examples, the node-monitoring agent NMA1 may monitor several attributes related to security posture such as, but not limited to, hardware root of trust capability, secure boot capability, image signing capability for firmware, use of certificates, security of application environment (e.g., capabilities such as firewall and OS hardening).

In some examples, the feature publisher agent FPA1 may determine values of resource labels corresponding to one or more of the platform characteristics of the worker node 102 based on the abovementioned monitoring of the worker node 102 by the NMA1. Further, the feature publisher agent FPA1 may publish the resource labels and values of the resource labels of the worker node 102. In some examples, publishing of the resource labels and their values may include communicating the resource labels and their values to the management node 108 by the feature publisher agent FPA1. In certain other examples, the publishing of the resource labels (e.g., resource label names) and their values may include storing the resource labels and their values in a storage media accessible by the management node 108.

Resource labels corresponding to the platform characteristic such as the thermal stability are hereinafter referred to as a first set of resource labels, associated values of which may include static information, real-time information, or both static and real-time information about the thermal stability. The term static information corresponding to a given resource label may refer to a designed value, specification value, or a rated value of the resource label. Further, the term real-time information for a given resource label may refer to a real-time value or a configured value of the resource label. For example, a resource label such as a number of cores in a given worker node may have static value of 12 that is a specification number of cores (e.g., total number of cores), however, during operation of the given worker node, a few of them may be active. Accordingly, a number of cores that are active, for example, 10 active cores may represent a real-time information regarding the resource label. Examples of the first set of resource labels may include, but are not limited to, one or more of a thermal design point (TDP) of a processor, a temperature of the processor, temperature of a memory module, fan speed, a platform form factor, thermal configuration, turbo spread, or a number of active cores. The feature publisher agent FPA1 may determine values of one or more of the first set of resource labels and publish the first set of resource labels and their respective values.

Further, resource labels corresponding to the platform characteristic such as the memory and bandwidth are hereinafter referred to as a second set of resource labels, associated values of which may include static information, real-time information, or both static and real-time information about the memory and bandwidth. Examples of the second set of resource labels my include, but are not limited to, one or more of a data rate, a bus width, a number of memory modules, and a number of memory sockets. The feature publisher agent FPA1 may determine values of one or more of the second set of resource labels and publish the second set of resource labels and their respective values.

Furthermore, resource labels corresponding to the platform characteristic such as the compute performance are hereinafter referred to as a third set of resource labels, associated values of which may include static information, real-time information, or both static and real-time information about the compute performance. Examples of the third set of resource labels my include, but are not limited to, one or more of a number of actively configured core C-states, a jitter value flag, or an OS interrupt affinity setting. The feature publisher agent FPA1 may determine values of one or more of the third set of resource labels and publish the third set of resource labels and their respective values.

Moreover, resource labels corresponding to the platform characteristic such as the security are hereinafter referred to as a fourth set of resource labels, associated values of which may include static information, real-time information, or both static and real-time information about the security capability of the worker node 102. Examples of the fourth set of resource labels my include, but are not limited to, one or more of an application security capability, an OS hardening capability, a secure boot capability, and a silicon root of trust capability. The feature publisher agent FPA1 may determine values of one or more of the fourth set of resource labels and publish the fourth set of resource labels and their respective values.

In some examples, the feature publisher agent FPA1 may publish the resource labels and their values by way of sending resource label data 103 (labeled as RLD_WN1 in FIG. 1) corresponding to the worker node 102 to the management node 108 via the network 110. For example, the resource label data 103 may include key-value pairs, for example, resource labels (e.g., names of the resource labels) and their respective values for some or all of the first set of resource labels, the second set of resource labels, the third set of resource labels, or the fourth set of resource labels corresponding to the worker node 102. Similarly, the feature publisher agents FPA2 and FPA3 may also send resource label data 105 (labeled as RLD_WN2 in FIG. 1) and 107 (labeled as RLD_WN3 in FIG. 1) of the worker nodes 104 and 106, respectively, to the management node 108. The resource label data 105 and 107 may include key-value pairs, for example, the resource labels and their respective values for the worker nodes 104, and 106, respectively.

The management node 108 may obtain the resource labels and values of the resource labels (in the form of the resource labels data 103, 105, 107) from the plurality of worker nodes 102-106. Further, the management node 108 may also receive a workload deployment request including a workload description a workload to be deployed. The management node 108 may manage the deployment of the workload based on a workload description (described later) and one or more custom resource labels that are determined based on the resource labels received from the plurality of worker nodes 102-106 (described later). As depicted in FIG. 1, in some examples, the management node 108 may be a device including a processor or microcontroller and/or any other electronic component, or a device or system that may facilitate various compute and/or data storage services, for example. Examples of the management node 108 may include, but are not limited to, a desktop computer, a laptop, a smartphone, a server, a computer appliance, a workstation, a storage system, or a converged or hyperconverged system, and the like that is configured to manage deployment of workloads. Further, in certain examples, the management node 108 may be a virtual machine or a containerized application executing on hardware in the networked system 100.

In some examples, the management node 108 may include a processing resource 112 and a machine-readable medium 114. The machine-readable medium 114 may be any electronic, magnetic, optical, or other physical storage device that may store data and/or executable instructions 116. For example, the machine-readable medium 114 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 114 may be non-transitory. As described in detail herein, the machine-readable medium 114 may be encoded with the executable instructions 116 to perform one or more methods, for example, methods described in FIGS. 4 and 5.

Further, the processing resource 112 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 116 stored in the machine-readable medium 114, or combinations thereof. The processing resource 112 may fetch, decode, and execute the instructions 116 stored in the machine-readable medium 114 to manage deployment of a workload (described further below). As an alternative or in addition to executing the instructions 116, the processing resource 112 may include at least one integrated circuit (IC), control logic, electronic circuits, or combinations thereof that include a number of electronic components for performing the functionalities intended to be performed by the management node 108 (described further below). Moreover, in certain examples, where the management node 108 may be a virtual machine or a containerized application, the processing resource 112 and the machine-readable medium 114 may represent a processing resource and a machine-readable medium of the hardware or a computing system that hosts the management node 108 as the virtual machine or the containerized application.

During operation, the processing resource 112 may obtain the resource label data 103, 105, and 107 from the worker nodes 102, 104, 106, respectively, and store the received resource label data 103, 105, and 107 into the machine-readable medium 114 as a resource label repository 118. In some examples, the processing resource 112 may obtain the resource label data 103, 105, and 107 periodically or at random intervals from the worker nodes 102, 104, 106, respectively. Moreover, the processing resource 112 may determine values of one or more custom resource labels for each of the plurality of worker nodes 102-106. Examples of the custom resource labels that are determined by the processing resource 112 may include, but are not limited to, a turbo index, a memory bandwidth index, a computational jitter index, or a security index. In some examples, the processing resource 112 may determine a value of each custom resource label of the one or more custom resource labels based on values of respective sets of resource labels, for example, the first set of resource labels, the second set of resource labels, the third set of resource labels, or the fourth set of resource labels.

In the description hereinafter, example calculations of these custom resource labels have been described based on one or more resource labels of the respective sets of the resource labels for illustration purposes. It is to be noted that other resource labels from the respective set of resource label or other sets of the resource labels may also be utilized to determine the value of the custom resource labels without limiting the scope of the present disclosure. In addition, in some examples, different relationships or equations than the ones illustrated in the present disclosure may be used to determine values of the custom resource labels without limiting the scope of the present disclosure.

The turbo index for a given worker node is an example of a custom resource label, and a value of the turbo index may be indicative of a capability of the given worker node to perform without failure under demanding conditions such as, for example, large frequency variations. For the given worker node, a higher value of the turbo index is indicative of better capability of the worker node to handle high frequency demands during its operation. In some examples, the processing resource 112 may determine the turbo index based on one or more of the first set of the resource labels. In order to determine the turbo index, for the given worker node, the processing resource 112 may retrieve one or more of the first set of the resource labels and their respective values from the resource label repository 118 and calculate the turbo index based on certain preset relationships between one or more of the first set of the resource labels. By way of example, the turbo index for the given worker node may be determined based on resource labels such as turbo spread index, TDP of the processors, and the number of active cores on the given worker node. In one example, the processing resource 112 may determine the turbo index ($TI_k$) for a worker node k using following equation (1).

$$TI_k = \frac{TurboSpreadIndex_k * N_k}{TDP_k} \quad (1)$$

where, $TurboSpreadIndex_k$ represents a turbo spread index (described below) for the worker node k, $N_k$ represents a number of active cores on the worker node k, $TDP_k$ represents a thermal design point of the worker node k, and k represents any of worker node 102, 104, or 106. Equation (1) represents an example calculation for determining the turbo index for illustration purposes. In some other examples, values of other resource labels from the first set of resource labels or other sets of the resource labels may also be utilized to calculate the turbo index, without limiting the scope of the present disclosure.

In some examples, the turbo spread index ($TurboSpreadIndex_k$) may be determined based on values of a base operating frequency ($F_{base\_k}$), a minimum operating frequency ($F_{min\_k}$), and a maximum operating frequency ($F_{max\_k}$) (e.g., turbo frequency) of a processor for the worker node k. By way of example, the base operating frequency may be a frequency at which the processor is designed to operate when about half of the cores are active. The minimum operating frequency may be achieved when all cores of the processor are active. Further, the maximum operating frequency may be achieved when a single core of the processor is active. In some examples, turbo spread index ($TurboSpreadIndex_k$) may be determined based on a frequency spread ($F_{spread\_k}$) and a frequency boost ($F_{boost\_k}$) for the given worker node k. The processing resource 112 may determine the frequency spread ($F_{spread\_k}$) and the frequency boost ($F_{boost\_k}$) using following equation (2) and equation (3), respectively.

$$F_{spread\_k} = (F_{max\_k} - F_{min\_k}) * 10 \quad (2)$$

$$F_{boost\_k} = (F_{max\_k} - F_{base\_k}) * 10 \quad (3)$$

Accordingly, in some examples, the processing resource 112 may determine the turbo spread index ($TurboSpreadIndex_k$) as being equal to frequency boost ($F_{boost\_k}$) if the frequency spread is lower than or equal to zero (i.e., $F_{spread\_k} \leq 0$). However, if frequency spread is greater than zero (i.e., $F_{spread\_k} > 0$), the processing resource 112 may determine the turbo spread index ($TurboSpreadIndex_k$) using equation (4).

$$TurboSpreadIndex_k = \frac{F_{boost\_k}}{F_{spread\_k}} \quad (4)$$

Furthermore, the computational jitter index for a given worker node is another example of a custom resource label, and a value of the computational jitter index may be indicative of the extent of compute cycles lost due to stalls each time the processor shifts its operating frequency. For the given worker node, a higher value of the computational jitter index is indicative of larger variability in performance due to frequency fluctuations, and thereby a lesser degree of deterministic or predictable performance. In some examples, the processing resource 112 may determine the computational jitter index based on one or more of the third set of the resource labels. In order to determine the computational jitter index, for the given worker node, the processing resource 112 may retrieve the third set of the resource labels and their respective values from the resource label repository 118 and calculate the computational jitter index based on certain preset relationships between one or more of the third set of the resource labels. By way of example, the computational jitter index ($CJI_k$) for the given worker node k may be determined based on the frequency boost ($F_{boost\_k}$), a jitter value flag ($JF_k$), and the number of actively configured core C-states ($NC_k$) using following equation (5).

$$CJI_k = JF_k * (F_{max\_k} + NC_k) * 10 \quad (5)$$

where, the jitter value flag $JF_k$ may be set to zero (0) when jitter control is enabled. Alternatively, the jitter value flag $JF_k$ may be set to one (1) when jitter control is disabled.

Further, the memory bandwidth index for a given worker node is another example of a custom resource label, and a value of the memory bandwidth index may be indicative of how fast memory transactions can be handled by the given worker node. For the given worker node, a higher value of the memory bandwidth index is indicative of the given worker node's ability to move larger amounts of data between the processor and memory devices, thereby offering better performance. In some examples, the processing resource 112 may determine the memory bandwidth index based on one or more of the second set of the resource labels. In order to determine the memory bandwidth index, for the given worker node k, the processing resource 112 may retrieve the second set of the resource labels and their respective values from the resource label repository 118 and calculate the memory bandwidth index ($MBI_k$) based on certain preset relationships between one or more of the second set of the resource labels. By way of example, the processing resource 112 may determine the memory bandwidth index ($MBI_k$) for the worker node k using following equation (6).

$$MBI_k = \left(\frac{PBW_k}{ABW_k}\right) * 10 \quad (6)$$

where, $PBW_k$ represent a peak (or theoretical) memory bandwidth of the worker node k and $ABW_k$ represents available memory bandwidth of the worker node k with configuration constraints.

In some examples, the peak memory bandwidth $PBW_k$ for the worker node k may be determined based on specification or rated data rate ($DR_{spec\_k}$) (e.g., maximum data rate) supported by a memory module (e.g., DIMM) installed in the worker node k, a bus width of the memory module ($BUS_{width\_k}$), the maximum number of memory modules supported per channel ($MM_{max\_k}$), and the number of memory sockets ($N_{sockets\_k}$). By way of example, the processing resource 112 may determine the peak memory bandwidth $PBW_k$ for the worker node k using following equation (7).

$$PBW_k = DR_{spec\_k} * \left(\frac{BUS_{width\_k}}{8}\right) * MM_{max\_k} * N_{sockets\_k} \qquad (7)$$

Further, the available memory bandwidth $ABW_k$ for the worker node k may be determined based on an actual data rate ($DR_{actual\_k}$) of the memory module (e.g., DIMM) installed in the worker node k, bus width of the memory module ($BUS_{width\_k}$), an actual number of memory modules supported per channel ($MM_{actual\_k}$), and number of memory sockets ($N_{sockets\_k}$). By way of example, the processing resource 112 may determine the available memory bandwidth $ABW_k$ for the worker node k using following equation (8).

$$ABW_k = DR_{actual\_u} * \left(\frac{BUS_{width\_k}}{8}\right) * MM_{actual\_k} * N_{sockets\_k} \qquad (8)$$

In one example, for the worker node k having specification data rate ($DR_{spec\_k}$) being 2933 MT/s, actual data rate ($DR_{spec\_k}$) being 2933 MT/s, the bus width of the memory module ($BUS_{width\_k}$) being 64, the maximum number of memory modules supported per channel ($MM_{max\_k}$) being 2, and the number of memory sockets ($N_{sockets\_k}$) being 2, the peak memory bandwidth $PBW_k$ may be determined as being 282 Gbps and the available memory bandwidth $ABW_k$ may be determined as being 282 Gbps. Consequently, for the worker node k, the memory bandwidth index $MBI_k$ may be determined as being 10. In another example, for the worker node k having specification data rate ($DR_{spec\_k}$) being 2933 MT/s, actual data rate ($DR_{spec\_k}$) being 2667 MT/s, the bus width of the memory module ($BUS_{width\_k}$) being 64, and the maximum number of memory modules supported per channel ($MM_{max\_k}$) being 2, the number of memory sockets ($N_{sockets\_k}$) being 2, the peak memory bandwidth $PBW_k$ may be determined as being 282 Gbps and the available memory bandwidth $ABW_k$ may be determined as being 256 Gbps. Consequently, for the worker node k, the memory bandwidth index $MBI_k$ may be determined as being 9.

Moreover, in some examples, the security index for a given worker node is yet another example of a custom resource label, and a value of the security index may be indicative of how secure the given worker node is from security threats. For the given worker node, a higher value of the security index is indicative of better capability of the worker node to handle secure transactions. In some examples, the processing resource 112 may determine the security index based on one or more of the fourth set of the resource labels. In order to determine the security index, for the given worker node, the processing resource 112 may retrieve the fourth set of the resource labels and their respective values from the resource label repository 118 and calculate the security index based on certain preset relationships between one or more of the fourth set of the resource labels. By way of example, the fourth set of resource labels such as the application security capability, the OS hardening capability, the secure boot capability, and the silicon root of trust capability may each be assigned predetermined weights. Table-1 depicted below illustrates example weights assigned to the fourth set of resource labels.

TABLE 1

Example weights assigned to the fourth set of resource labels

| Labels | Application Security Capability | OS Hardening Capability | Secure boot Capability | Silicon Root of Trust Capability |
|---|---|---|---|---|
| Weight | 4 | 2 | 1 | 3 |

It is to be noted that, Table-1 depicts example weights for illustration purposes. In some examples, any suitable weights may be assigned to one or more of the fourth set of resource labels. In the example of Table-1, a total weight of 10 is distributed among the four resource labels. Accordingly, in some examples, the processing resource 112 may determine the security index for the given worker node based on the weights assigned to the one or more of the fourth set of resource labels. In particular, in one example, the security index for the given worker node may be determined as a sum of weights of one or more of the fourth set of resource labels that are applicable to the given worker node. For instance, if the given worker node does not have secure boot capability but has rest of the capabilities illustrated in Table-1, the worker node is said to have the security index of nine (9). In another example, if the given worker node does not have silicon root of trust capability but has rest of the capabilities illustrated in Table-1, the worker node is said to have the security index of seven (7).

In some examples, once the values of the custom resource labels are determined, the processing resource 112 may store the determined values of the custom resource labels into the machine-readable medium as a custom resource label repository 120. In the custom resource label repository 120, the processing resource 112 may store custom resource labels and their respective values for each other worker nodes 102-106, for example. Table-2 represented below depicts an example data stored in the custom resource label repository 120.

TABLE 2

Example data stored in the custom resource label repository 120

| Worker Node | Turbo Index | Memory Bandwidth Index | Computational Jitter Index | Security Index |
|---|---|---|---|---|
| 102 | 6 | 7 | 1 | 4 |
| 104 | 10 | 9 | 3 | 9 |
| 106 | 8 | 10 | 5 | 10 |

It is to be noted that the values of the custom resource labels shown in Table-2 are for illustration purposes. Example values of the custom resource labels may be determined using the respective resource labels and example calculations illustrated in the description supra.

Moreover, during its operation, the management node 108 may receive a request to deploy a workload (hereinafter referred to as a workload deployment request) in the cluster (the networked system of nodes). The management node 108, in accordance with aspects of the present disclosure may facilitate deployment of the workload on a worker node of the worker nodes 102-106 that may best fit to requirement of the workload. In some examples, the management node 108 may identify the right kind of worker node based on the values of the custom resource labels of the worker nodes 102-106 and information contained in the received workload deployment request.

In some examples, the management node 108 may receive the workload deployment request in the form of a workload configuration file (e.g., a pod manifest file, such as, a YAML file in case of the workload being a pod). Upon receipt of the workload deployment request, the processing resource 112 may store the workload configuration file, for example, a workload configuration file 122, in the machine-readable medium 114. The workload configuration file 122 may be defined by one or more parameters, including a workload description. In particular, the workload description may set certain requirements of the workload. In some examples, the workload description may include information about one or more of business service level agreements (SLAs), standard application workload names, component affinity attributes, generic descriptions, or architectural attributes corresponding to the workload.

Examples of the business SLAs may include, but are not limited to, one or more of response time, availability, throughput, cost-optimized, energy-optimized, scalability, or flexible capacity. Further, examples of the standard application workload names may include, but are not limited to, one or more of Java, MSSQL, Oracle, MongoDB, or Cassandra. Further, examples of the generic descriptions may include, but are not limited to, one or more of NoSQL database (DB), RDBMS, in-memory DB, or time-series DB. Moreover, examples of the component affinity attributes may include, but are not limited to, compute-intensive, memory-intensive, storage-intensive, or network-bound. Additionally, examples of the architectural attributes may include, but are not limited to, fine-grained details such as the presence of software parallelism (multi-threaded), whether the workload is hardware-acceleration capable (GPUs or FPGAs), vector instruction usage, or memory access patterns (load-heavy or store-heavy).

Figure 2A:
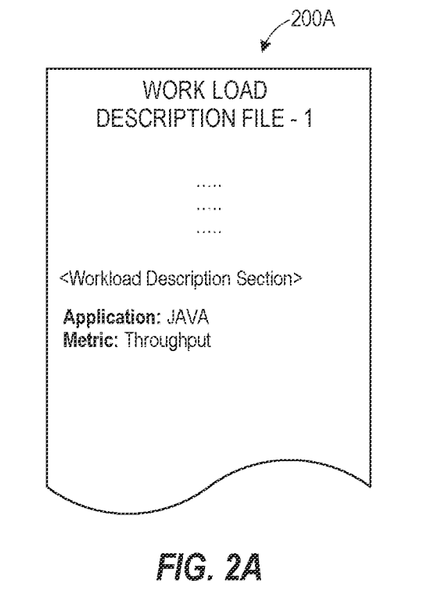
FIGS. 2A, 2B, and 2C depict example workload configuration files, in accordance with an example.
Figure 2B:
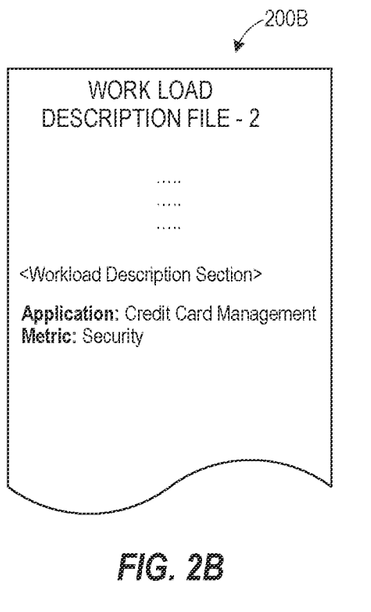
Figure 2C:
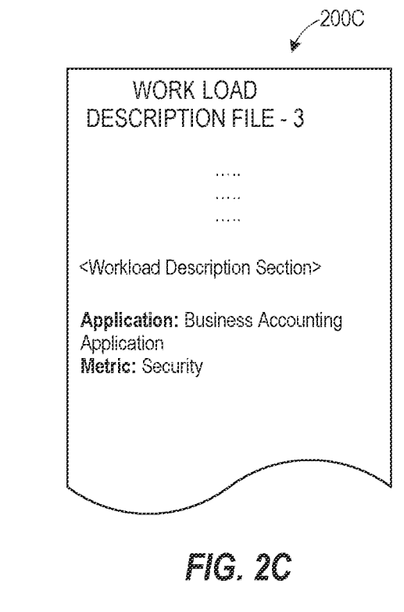

Referring now to FIGS. 2A, 2A, and 2C, FIGS. 2A, 2A, and 2C respectively depict examples 200A, 200B, and 200C of the workload configuration file 122. As depicted in FIG. 2A, the workload configuration file 200A is depicted which may define a first workload. In the workload configuration file 200A, workload descriptions may include an application type being "Java" and a business SLA metric being "Throughput." Accordingly, the first workload may be identified by the processing resource 112 as being a Java application that demands high throughput. Similarly, in FIG. 2B, the workload configuration file 200B is depicted that may define a second workload. In the workload configuration file 200B, workload description may include an application type being "credit card management" and a business SLA metric being "security." Accordingly, the second workload may be identified by the processing resource 112 as being a credit card management application that demands high data security. Moreover, in FIG. 2C, the workload configuration file 200C is depicted that may define a third workload. In the workload configuration file 200C, the workload descriptions may include an application type being "business accounting application" and a business SLA metric being "security." Accordingly, the third workload may be identified by the processing resource 112 as being a business accounting application that demands high data security.

Turning back to FIG. 1, in some examples, for a received workload deployment request, the processing resource 112 may generate a prioritized list of the custom resource labels based on the workload description corresponding to the workload to be deployed. The prioritized list of the custom resource labels may represent an ordered list of custom resource labels in accordance with their relevance to the workload description. In one example, the processing resource 112 may arrange the custom resource labels in a descending order of relevance for the workload. The processing resource 112 may generate the prioritized list of the custom resource labels for the workload based on a first knowledge base that contains a mapping between several workload descriptions and prioritized lists of the custom resource labels. In some examples, the processing resource 112 may store the first knowledge base in the machine-readable medium 114. Table-3 presented below depicts an example first knowledge base.

TABLE 3

Example first knowledge base

| Workload Descriptions | Prioritized list of custom resource labels | | | |
|---|---|---|---|---|
| | First Priority (highest) | Second Priority | Third Priority | Fourth Priority (lowest) |
| Java, Throughput | Turbo Index | Memory Bandwidth Index | Security Index | Computational Jitter Index |
| Credit Card Management, Security | Turbo Index | Security Index | Memory Bandwidth Index | Computational Jitter Index |
| Business Accounting, Security | Turbo Index | Security Index | Memory Bandwidth Index | Computational Jitter Index |
| Java, Security | Turbo Index | Security Index | Memory Bandwidth Index | Computational Jitter Index |
| Math Application, Accuracy | Turbo Index | Computational Jitter Index | Memory Bandwidth Index | Security Index |

In some examples, when the workload deployment request is received, the processing resource 112 may parse its workload configuration file to identify the workload descriptions contained in the workload configuration file. Parsing of the workload configuration file may include analyzing text of the workload configuration file to find predefined attributes that represents the workload description. Once the workload descriptions are identified, the processing resource 112 may generate the prioritized list of the custom resource labels for the workload to be deployed by referring to the first knowledge base. By way of example, if a workload deployment request to deploy a workload such as the first workload defined by the workload configuration file 200A (see FIG. 2A) is received by the management node 108, the processing resource 112 may generate the prioritized list of the custom resource labels as being "turbo index, memory bandwidth index, security index, and computational jitter index," wherein the first entry in the prioritized list represents a custom resource label with the highest relevance and the last entry in the prioritized list represents a custom resource label with the lowest relevance to the first workload.

Similarly, if a workload deployment request to deploy the second workload defined by the workload configuration file 200B (see FIG. 2B) is received by the management node 108, the processing resource 112 may generate the prioritized list of the custom resource labels as being "turbo index, security index, memory bandwidth index, and computational jitter index." Further, in a similar fashion, if a workload deployment request to deploy the third workload defined by the workload configuration file 200C (see FIG. 2C) is received by the management node 108, the processing resource 112 may generate the prioritized list of the custom resource labels as being "turbo index, security index, memory bandwidth index, and computational jitter index."

Once the prioritized list of the custom resource labels is generated for the workload, the processing resource 112 may identify a worker node of the worker nodes 102-106 based on the values of the custom resource labels of the worker nodes 102-106 and the prioritized list of the custom resource labels generated corresponding to the workload. In particular, in some examples, the processing resource 112 may select a worker node that has the highest value of a custom resource label at the entry indicating highest relevance (e.g., the first entry) in the prioritized list among the worker nodes 102-106. In some examples, if the processing resource 112 determines that there exists a tie in the values of the first entry in the prioritized list of the custom resource labels, the processing resource 112 may start performing similar check, as performed for the first entry, for rest of the entries in the in the prioritized list of the custom resource labels in the descending order of relevancy. For example, for a workload such as the first workload that has the turbo index as the first entry in the prioritized list of the custom resource labels, the processing resource 112 may select a worker node having the highest value of the turbo index among the worker nodes 102-106. As depicted in Table-2, the value (e.g., 10) of turbo index for the worker node 104 is highest amongst the worker nodes 102-106. Accordingly, for the workload such as the first workload, the processing resource 112 may select the worker node 104 as a host worker node. It is to be noted that, in some examples, the processing resource 112 may also generate the prioritized list of the custom resource labels by arranging the custom resource labels in an ascending order of relevance for the workload, in which case operations to identify a suitable host worker node may be adapted accordingly, without limiting the scope of the present disclosure.

In yet another example, for the workload such as the second workload that has the security index at the first entry in the prioritized list of the custom resource labels, the processing resource 112 may select a worker node having the highest value of the security index among the worker nodes 102-106. As depicted in Table-2, the value (e.g., 10) of security index for the worker node 106 is highest amongst the worker nodes 102-106. Accordingly, for the workload such as the third workload, the processing resource 112 may select the worker node 106 as a host worker node. Similarly, for the workload such as the workload defined by the workload configuration file 200C, the processing resource 112 may select the worker node 104 as a host worker node.

Once the host worker node for the requested workload is identified, the management node 108 may deploy the workload on the worker node identified as the host worker node. In some examples, if the workloads such as the first workload, the second workload, and the third workload are requested to be deployed, the processing resource 112 may deploy the first workload and the third workload on the worker node 104, and deploy the second workload on the worker node 106.

Additionally, in some examples, the processing resource 112 may continuously update the resource label repository 118 based on the incoming resource label data 103, 105, and 105, and update the values of the custom resource labels. In certain examples, the processing resource 112 may also redeploy the workloads based on updated values of the custom resource labels and the prioritized list of custom resource labels if required. For example, if, over time, the memory bandwidth index of the worker node 106 reduces from to 10 to 8 and the memory bandwidth index of the worker node 106 does not decrease (e.g., stays the same or increases), the processing resource 112 may redeploy the second workload from the third worker node 106 to the second worker node 104.

As will be appreciated, the management node 108 presented herein facilitates enhanced scheduling and deployment of the workloads via use of meaningfully generated custom resource labels—values of which may be automatically calculated and/or updated based on several fine grained resource labels that are published by the worker nodes. By building scheduling or deployment capabilities on workload-orchestration systems (e.g., Kubernetes) based on published performance and security capabilities, or performance and security limitations, user can run workloads such as business applications with awareness of hardware and software capabilities and/or vulnerabilities of the worker nodes such as the worker nodes 102-106. In particular, by virtue of enhanced deployment of the workloads as effected by various example aspects presented herein, workloads may be executed on a well-equipped worker node having sufficient resources to fulfill requirements of the workloads. Deployment of the workloads based on the values of the custom resource labels and the workload descriptions may enable enhanced performance and security for workloads on networked systems (e.g., Kubernetes clusters) on customer's premise or as-a-service offering. Moreover, as the values of the custom resources and the workload descriptions are determined automatically and dynamically during the operation, manual intervention may be reduced or eliminated.

Figure 3:
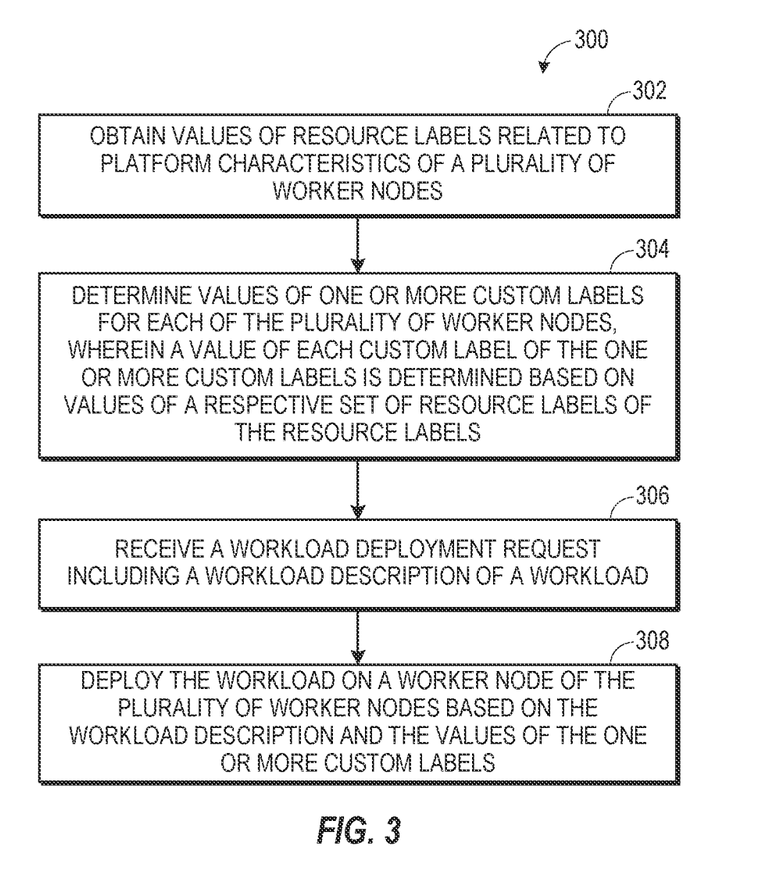
FIG. 3 is a flow diagram depicting a method for deploying a workload, in accordance with an example.

Referring now to FIG. 3, a flow diagram depicting a method 300 for deploying a workload is presented, in accordance with an example. For illustration purposes, the method 300 will be described in conjunction with the networked system 100 of FIG. 1. The method 300 may include method blocks 302, 304, 306, and 308 (hereinafter collectively referred to as blocks 302-308) which may be performed by a processor-based system such as, for example, the management node 108. In particular, operations at each of the method blocks 302-308 may be performed by the processing resource 112 by executing the instructions 116 stored in the machine-readable medium 114 (see FIG. 1). Moreover, it is to be noted that in some examples, the order of execution of the blocks 302-308 may be different that shown in FIG. 4. For example, the blocks 302-308 may be performed in series, in parallel, or a series-parallel combination.

At block 302, the processing resource 112 may obtain values of resource labels related to platform characteristics of the plurality of worker nodes 102-106, for example. Further, at block 304, the processing resource 112 may determine values of one or more custom resource labels for each of the plurality of worker nodes 102-106. In particular, a value of each custom resource label of the one or more custom resource labels may be determined based on values of a respective set of resource labels. Additional details regarding determination of the value of the custom resource labels have been described in conjunction with FIG. 1.

Furthermore, at block 306, the processing resource 112 may receive a workload deployment request including a workload description of a workload to be deployed. Once received, the processing resource 112 may store a workload configuration file (e.g., the workload configuration file 122) containing the workload description corresponding to the workload into the machine-readable medium 114. Moreover, in some examples, at block 308, the processing resource 112 may deploy the workload on a worker node of the plurality of worker nodes 102-106 based on the workload description and the values of the custom resource labels, in a similar fashion as described in conjunction with FIG. 1.

Figure 4:
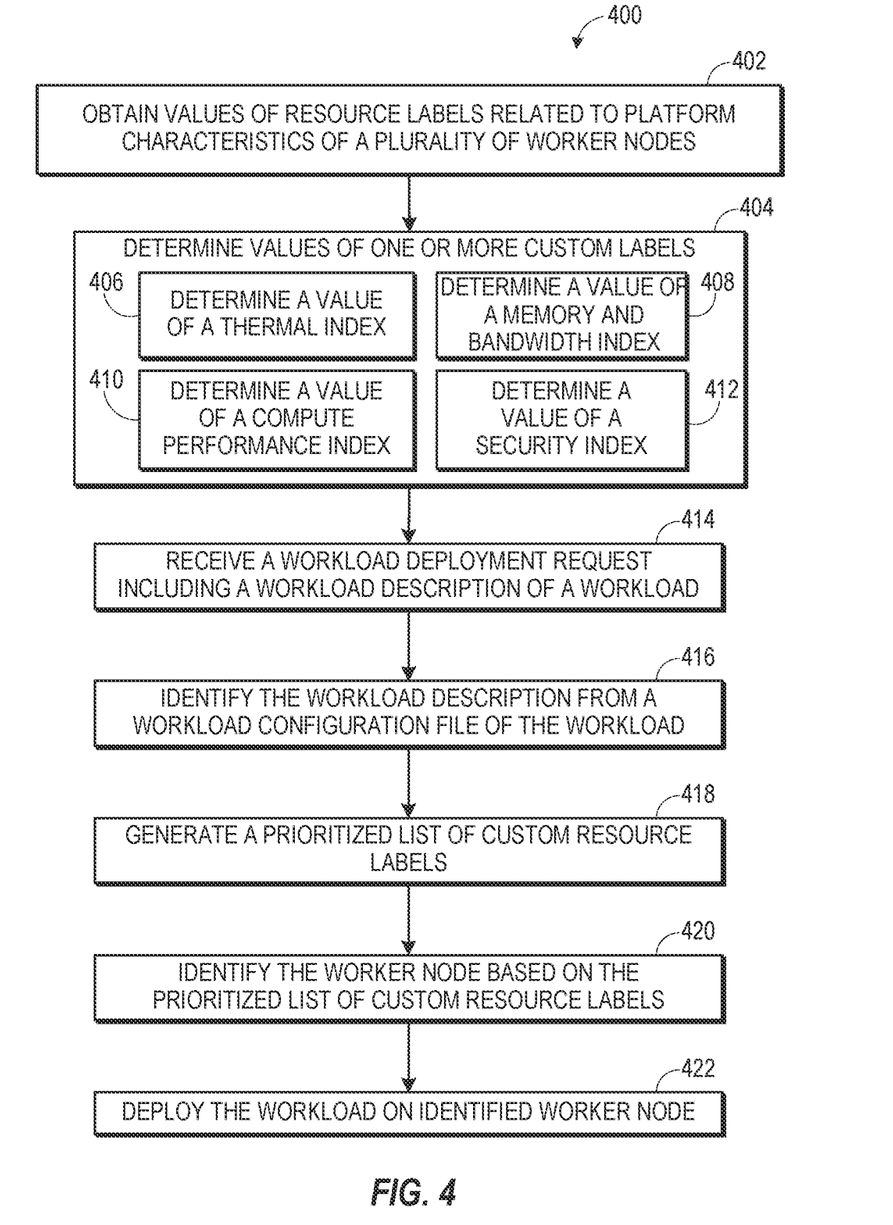
FIG. 4 is a flow diagram depicting a method for deploying a workload, in accordance with another example.

Moving now to FIG. 4, a flow diagram depicting a method 400 for deploying a workload is presented, in accordance with another example. For illustration purposes, the method 400 will be described in conjunction with the networked system 100 of FIG. 1. The method 400 may include method blocks 402, 404, 406, 408, 410, 412, 414, 416, 418, 420, and 422 (hereinafter collectively referred to as blocks 402-422), which may be performed by a processor-based system, for example, the management node 108. In particular, operations at the method blocks 402-422 may be performed by the processing resource 112 by executing the instructions 116 stored in the machine-readable medium 114. For the sake of brevity, certain details of various aspects illustrated in blocks 402-422 is not repeated as such details have been described in one or more of FIGS. 1-3. Moreover, it is to be noted that in some examples, the order of execution of the blocks 406-422 may be different from the one shown in FIG. 4. For example, the blocks 402-422 may be performed in series, in parallel, or a series-parallel combination.

At block 402, the processing resource 112 may obtain values of resource labels related to platform characteristics of the plurality of worker nodes 102-106, for example. Further, at block 404, the processing resource 112 may determine values of one or more custom resource labels for each of the plurality of worker nodes 102-106. In some examples, determination of the values of one or more custom resource labels at block 404 may include determining one or more custom resource labels such as the turbo index, the memory and bandwidth index, the computational jitter index, or the security index. For example, at block 406, the processing resource 112 may determine a value of the turbo index based on one or more of the first set of resource labels. Further, in some examples, at block 408, the processing resource 112 may determine a value of the memory and bandwidth index based on one or more of the second set of resource labels. Furthermore, in certain examples, at block 410, the processing resource 112 may determine a value of the computational jitter index based on one or more of the third set of resource labels. Moreover, in some examples, at block 412, the processing resource 112 may determine a value of the security index based on one or more of the fourth set of resource labels. It is to be noted execution of the operation at block 404 may include executing fewer or all of the blocks 406-412. Further, operations at blocks 406 may be performed in series, in parallel, or in combination of series and parallel.

Further, at block 414, the processing resource 112 may receive a workload deployment request including a workload description of a workload to be deployed. As previously noted, the workload may be described via a workload configuration file (e.g., the workload configuration file 122). At block 416, the processing resource 112 may identify the workload description from the workload configuration file 122 by parsing the workload configuration file 122. Moreover, in some examples, at block 418, the processing resource 112 may generate a prioritized list of custom resource labels for the workload based on the workload description. Furthermore, at block 420, the processing resource 112 may identify the worker node based on the prioritized list of custom resource labels and the values of the custom resource labels of the plurality of worker nodes 102-106. Additionally, at block 422, the processing resource 112 may deploy the workload on the identified worker node.

Figure 5:
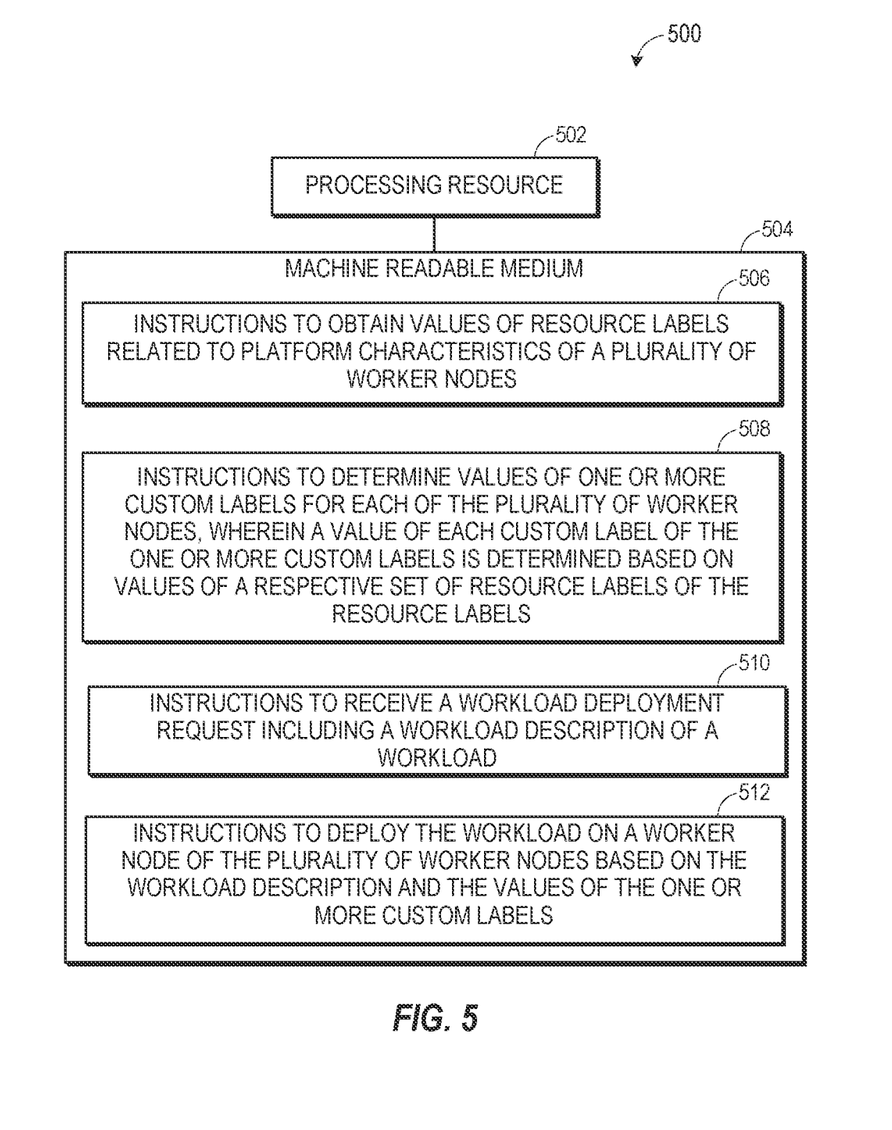
FIG. 5 is a block diagram depicting a processing resource and a machine-readable medium encoded with example instructions to deploy a workload, in accordance with an example.

Moving to FIG. 5, a block diagram 500 depicting a processing resource 502 and a machine-readable medium 504 encoded with example instructions to facilitate enhanced deployment of workloads, in accordance with an example. The machine-readable medium 504 may be non-transitory and is alternatively referred to as a non-transitory machine-readable medium 504. In some examples, the machine-readable medium 504 may be accessed by the processing resource 502. In some examples, the processing resource 502 may represent one example of the processing resource 112 of the management node 108. Further, the machine-readable medium 504 may represent one example of the machine-readable medium 114 of the management node 108.

The machine-readable medium 504 may be any electronic, magnetic, optical, or other physical storage device that may store data and/or executable instructions. Therefore, the machine-readable medium 504 may be, for example, RAM, an EEPROM, a storage drive, a flash memory, a CD-ROM, and the like. As described in detail herein, the machine-readable medium 504 may be encoded with executable instructions 506, 508, 510, and 512 (hereinafter collectively referred to as instructions 506-512) for performing the method 300 described in FIG. 3. Although not shown, in some examples, the machine-readable medium 504 may be encoded with certain additional executable instructions to perform the method 400 of FIG. 4, and/or any other operations performed by the management node 108, without limiting the scope of the present disclosure.

The processing resource 502 may be a physical device, for example, one or more CPU, one or more semiconductor-based microprocessor, one or more GPU, ASIC, FPGA, other hardware devices capable of retrieving and executing the instructions 506-512 stored in the machine-readable medium 504, or combinations thereof. In some examples, the processing resource 502 may fetch, decode, and execute the instructions 506-512 stored in the machine-readable medium 504 to deploy workloads on one or more of the worker nodes 102-106. In certain examples, as an alternative or in addition to retrieving and executing the instructions 506-512, the processing resource 502 may include at least one IC, other control logic, other electronic circuits, or combinations thereof that include a number of electronic components for performing the functionalities intended to be performed by the management node 108 of FIG. 1.

The instructions 506 when executed by the processing resource 502 may cause the processing resource 502 to obtain values of resource labels related to platform characteristics of the plurality of worker nodes 102-106. Further, the instructions 508 when executed by the processing resource 502 may cause the processing resource 502 to determine values of one or more custom resource labels for each of the plurality of worker nodes 102-106. In some examples, a value of each custom resource label of the one or more custom resource labels is determined based on values of a respective set of resource labels of the resource labels. Furthermore, the instructions 510 when executed by the processing resource 502 may cause the processing resource 502 to receive a workload deployment request including a workload description of a workload. Moreover, the instructions 512 when executed by the processing resource 502 may cause the processing resource 502 to deploy the workload on a worker node of the plurality of worker nodes 102-106 based on the workload description and the values of the one or more custom resource labels.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A management node comprising:
   a processing resource; and
   a machine-readable medium storing one or more instructions that, when executed by the processing resource, cause the processing resource to:
   obtain values of resource labels related to platform characteristics of a plurality of worker nodes, wherein the platform characteristics comprise one or more of thermal stability, memory and bandwidth, compute performance, or security;
   determine values of one or more custom resource labels for each of the plurality of worker nodes, wherein a value of each custom resource label of the one or more custom resource labels is determined based on values of a respective set of resource labels of the resource labels;
   receive a workload deployment request comprising a workload description of a workload;
   determine, based on the workload description and at least a portion of the values of the one or more custom resource labels, a selected worker node of the plurality of worker nodes to use for deployment; and
   deploy the workload on the selected worker node of the plurality of worker nodes, thereby causing execution of the workload by the selected worker node.

2. The management node of claim 1, wherein the set of resource labels comprises one or more of:
   a first set of resource labels comprising static information, real-time information, or both static and real-time information about the thermal stability;
   a second set of resource labels comprising static information, real-time information, or both static and real-time information about the memory and bandwidth;
   a third set of resource labels comprising static information, real-time information, or both static and real-time information about the compute performance; or
   a fourth set of resource labels comprising static information, real-time information, or both static and real-time information about the security.

3. The management node of claim 1, wherein a custom resource label of the one or more custom resource labels is a turbo index, and wherein the instructions when executed cause the processing resource to determine a value of the turbo index based on one or more of a first set of the resource labels comprising one or more of a thermal design point of a processor, a temperature of the processor, temperature of a memory module, fan speed, a platform form factor, thermal configuration, or a number of active cores.

4. The management node of claim 1, wherein a custom resource label of the one or more custom resource labels is a memory bandwidth index, wherein the instructions when executed cause the processing resource to determine a value of the memory bandwidth index based on one or more of a second set of the resource labels comprising one or more of a data rate, a bus width, a number of memory modules, or a number of memory sockets.

5. The management node of claim 1, wherein a custom resource label of the one or more custom resource labels is a computational jitter index, wherein the instructions when executed cause the processing resource to determine a value of the computational jitter index based on one or more of a third set of the resource labels comprising one or more of a number of actively configured core C-states, a jitter value flag, or an OS interrupt affinity setting.

6. The management node of claim 1, wherein a custom resource label of the one or more custom resource labels is a security index, wherein the instructions when executed cause the processing resource to determine a value of the security index based on one or more of a fourth set of the resource labels comprising one or more of an application security capability, an OS hardening capability, a secure boot capability, and a silicon root of trust capability.

7. The management node of claim 1, wherein the workload comprises one or more of a container, a pod, a virtual machine, or a containerized application.

8. The management node of claim 1, the instructions when executed cause the processing resource to generate a prioritized list of custom resource labels for the workload based on the workload description.

9. The management node of claim 8, the instructions when executed cause the processing resource to identify the selected worker node based on the prioritized list of custom resource labels and the values of the one or more custom resource labels of the plurality of worker nodes.

10. A method comprising:
    obtaining, by a processor-based system, values of resource labels defining platform characteristics of a plurality of worker nodes, wherein the platform characteristics comprise one or more of thermal stability, memory and bandwidth, compute performance, or security;
    determining, by the processor-based system, values of one or more custom resource labels for each of the plurality of worker nodes, wherein a value of each custom resource label of the one or more custom resource labels is determined based on values of a respective set of resource labels of the resource labels;
    receiving, by the processor-based system, a workload deployment request comprising a workload description of a workload;
    determining, by the processor-based system, based on the workload description and at least a portion of the values of the one or more custom resource labels, a selected worker node of the plurality of worker nodes to use for deployment; and deploying, by the processor-based system, the workload on the selected worker node of the plurality of worker nodes, thereby causing execution of the workload by the selected worker node.

11. The method of claim 10, wherein determining the values of the one or more custom resource labels comprises determining one or more of:
   a value of a turbo index based on one or more of a first set of resource labels comprising a thermal design point of a processor, a temperature of the processor, temperature of a memory module, fan speed, or a number of active cores;
   a value of a memory bandwidth index based on one or more of a second set of resource labels comprising one or more of a data rate, a bus width, a number of memory modules, and a number of memory sockets;
   a value of a computational jitter index based on one or more of a third set of resource labels comprising a number of actively configured core C-states, a jitter value flag, and an OS interrupt affinity setting; or
   a value of a security index based on one or more of a fourth set of resource labels comprising one or more of an application security capability, an OS hardening capability, a secure boot capability, and a silicon root of trust capability.

12. The method of claim 10, further comprising identifying the workload description from a workload configuration file of the workload.

13. The method of claim 10, further comprising generating a prioritized list of custom resource labels for the workload based on the workload description.

14. The method of claim 13, further comprising identifying the selected worker node based on the prioritized list of custom resource labels and the values of the one or more custom resource labels of the plurality of worker nodes.

15. The method of claim 10, wherein the workload comprises one or more of a container, a pod, a virtual machine, or a containerized application.

16. A non-transitory machine-readable medium storing instructions executable by a processing resource, the instructions comprising:
   instructions to obtain values of resource labels related to platform characteristics of a plurality of worker nodes, wherein the platform characteristics comprise one or more of thermal stability, memory and bandwidth, compute performance, or security;
   instructions to determine values of one or more custom resource labels for each of the plurality of worker nodes, wherein a value of each custom resource label of the one or more custom resource labels is determined based on values of a respective set of resource labels of the resource labels;
   instructions to receive a workload deployment request comprising a workload description of a workload;
   instructions to determine, based on the workload description and at least a portion of the values of the one or more custom resource labels, a selected worker node of the plurality of worker nodes to use for deployment; and
   instructions to deploy the workload on the selected worker node of the plurality of worker nodes, thereby causing execution of the workload by the selected worker node.

17. The non-transitory machine-readable medium of claim 16, wherein the instructions further comprise one or more of:
   instructions to determine a value of a turbo index based on one or more of a first set of resource labels comprising a thermal design point of a processor, a temperature of the processor, temperature of a memory module, fan speed, or a number of active cores;
   instructions to determine a value of a memory bandwidth index based on one or more of a second set of resource labels comprising one or more of a data rate, a bus width, a number of memory modules, and a number of memory sockets;
   instructions to determine a value of a computational jitter index based on one or more of a third set of resource labels comprising a number of actively configured core C-states, a jitter value flag, and an OS interrupt affinity setting; or instructions to determine a value of a security index based on one or more of a fourth set of resource labels comprising one or more of an application security capability, an OS hardening capability, a secure boot capability, and a silicon root of trust capability.

18. The non-transitory machine-readable medium of claim 16, further comprising instructions to identify the workload description from a workload configuration file of the workload.

19. The non-transitory machine-readable medium of claim 16, further comprising instructions to generate a prioritized list of custom resource labels for the workload based on the workload description.

20. The non-transitory machine-readable medium of claim 19, further comprising instructions to identify the selected worker node based on the prioritized list of custom resource labels and the values of the one or more custom resource labels of the plurality of worker nodes.

* * * * *